INVENTORS
STEPHEN DESKEVICH
JOHN B. NEWMAN

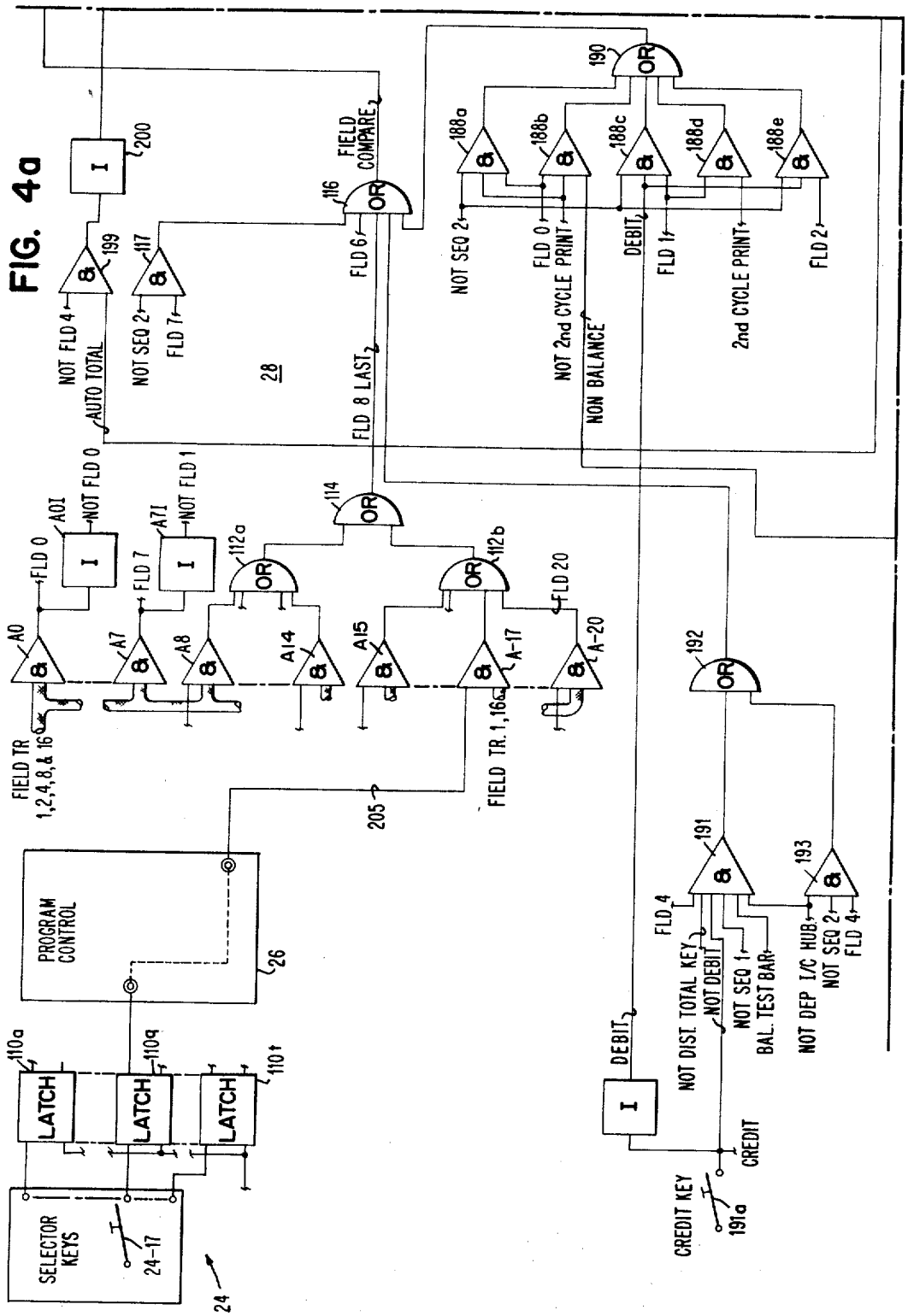

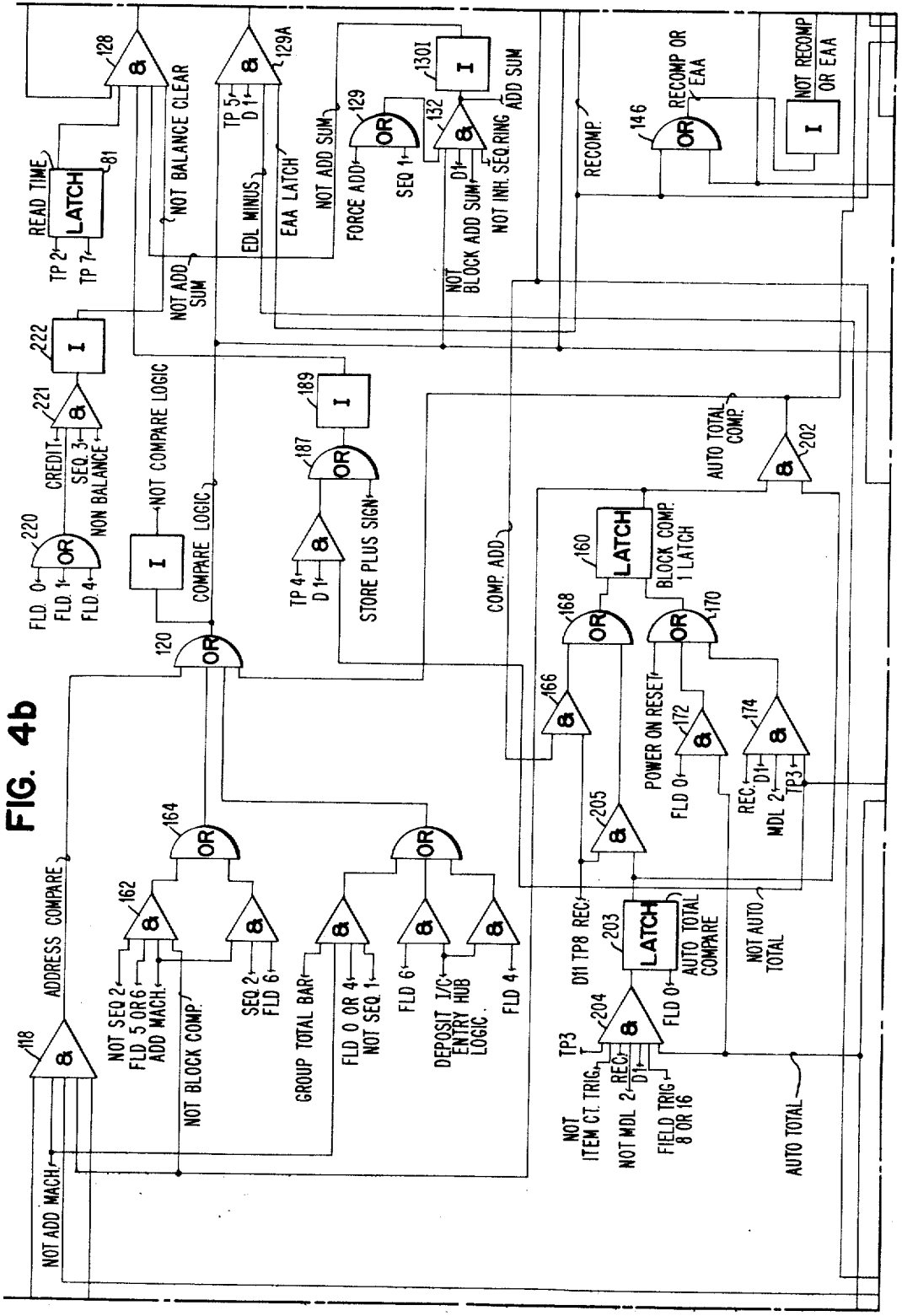

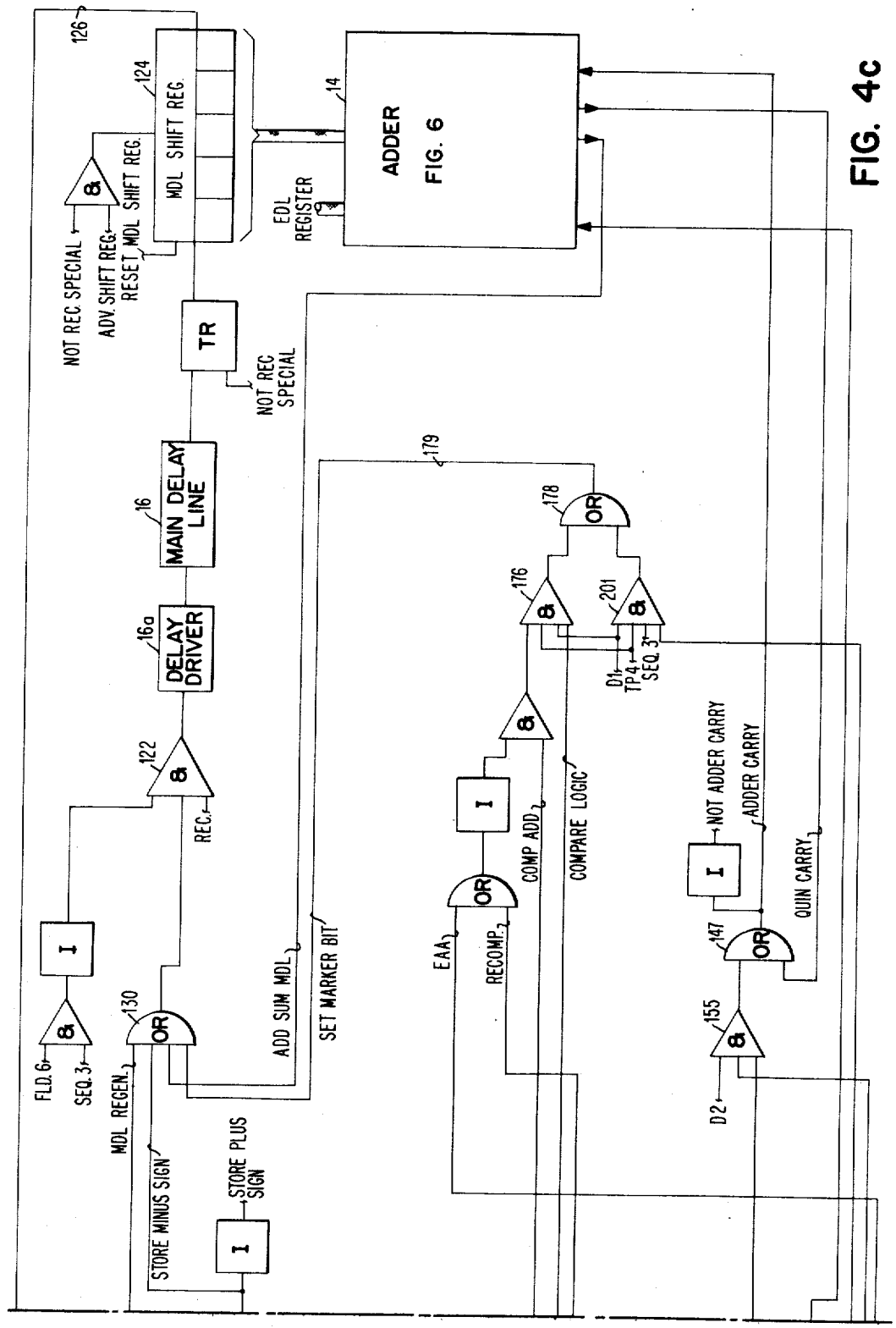

United States Patent Office 3,492,655
Patented Jan. 27, 1970

3,492,655
DATA PROCESSING FOR BANK
PROOF MACHINE
Stephen Deskevich, Endicott, and John B. Newman,
Vestal, N.Y., assignors to International Business Machines Corporation, Armonk, N.Y., a corporation of
New York
Filed Dec. 30, 1966, Ser. No. 606,182
Int. Cl. G11b 13/00; G06f 1/00, 7/00
U.S. Cl. 340—172.5                                                                1 Claim

ABSTRACT OF THE DISCLOSURE

In a bank proof machine, an entry delay line having a single field of data capacity is used as a buffer for entering the amounts of checks in a deposit, and updating deposit data in a main delay line storage device which has a capacity for a plurality of fields of data. Data is entered into the entry delay line through a keyboard and then into an adder with data from a selected field from the main delay line through the use of pluggable program cards and selector keys to produce a sum which is entered into the main delay line to replace the original data of the selected field.

---

This invention relates generally to data processing in a bank proof machine and it has reference in particular to the updating of a plurality of fields of data in a main delay line storage device by data from an entry delay line storage device.

Generally stated, it is an object of this invention to povide an improved data processing system for a bank proof application.

More specifically, it is an object of the invention to provide for selectively entering an amount of data and other information from batches of checks into predetermined account records for updating the records.

It is also an object of the invention to provide for entering data from a batch of checks into a selected field in a delay line storage device and for automatically performing a zero balance test at the end of the operation to determine whether the total amount of the checks agrees with the amount of an accompanying deposit slip.

Another object of the invention is to provide for using an entry delay line long enough to accommodate a complete field of data with a shift register for containing only a single digit field, and for using such delay line in conjunction with an adder for undating data in a main delay line which accommodates a plurality of such fields of data less one digit, and has a single digit shift register associated therewith at the end of the delay line which accommodates the missing digit.

Yet another object of the invention is to provide in an electronic bank proof machine for using an entry delay for updating data in selected ones of a plurality of fields in a main delay line.

Another important object of the invention is to provide for using a single field entry delay line with an adder for entering amounts to be added to or subtracted from any one of a number of fields in a main delay line.

It is an important object of this invention to provide for regenerating each of a plurality of fields of data in a main delay line unless data had been entered into an entry delay line for updating a particular field of the main delay line through operation of an adder associated with both delay lines.

In practicing the invention in accordance with a preferred embodiment thereof, an entry delay line having a capacity for a single field of data is used in a bank proof machine as a buffer storage device for entering the amounts of checks in a deposit and updating deposit data in a main delay line storage device which has a capacity for a plurality of fields of data. This is effected under the control of a number of timing rings which include a bit timing ring for timing a plurality of digit bits, a digit timing ring driven from the bit timing ring for keeping count of a number of digit positions in each field, and a field ring driven by the digit ring which keeps count of the various fields as they pass through the main delay line. A sequence counter advanced by the last field count determines the several operating sequences of the machine including principally add and print sequences.

Data is entered into the entry delay line by the operator actuating keys on a keyboard representing the amount, and the fields to be updated in the main delay line are selected by the operator actuating different selector keys, which through pluggable program cards provide connections for addressing different ones of the fields as they pass through a register at the end of the main delay line.

Updating of data in the main delay line is effected by entering the contents of the entry delay line and the selected field of the main delay line into an adder which produces a sum to replace the original amount in the selected field. A zero balance check is made at the end of the entry of the batch of checks representing a deposit and the difference total and debitor batch total are listed if other than a zero balance is detected. The main storage can be addressed by operating a motor bar to automatically list all totals in the main delay line for audit trail purposes.

The foregoing and other objects, features and advantages of the invention will be apparent from the following more particular description of a preferred embodiment of the invention, as illustrated in the accompanying drawings.

Figure 1:
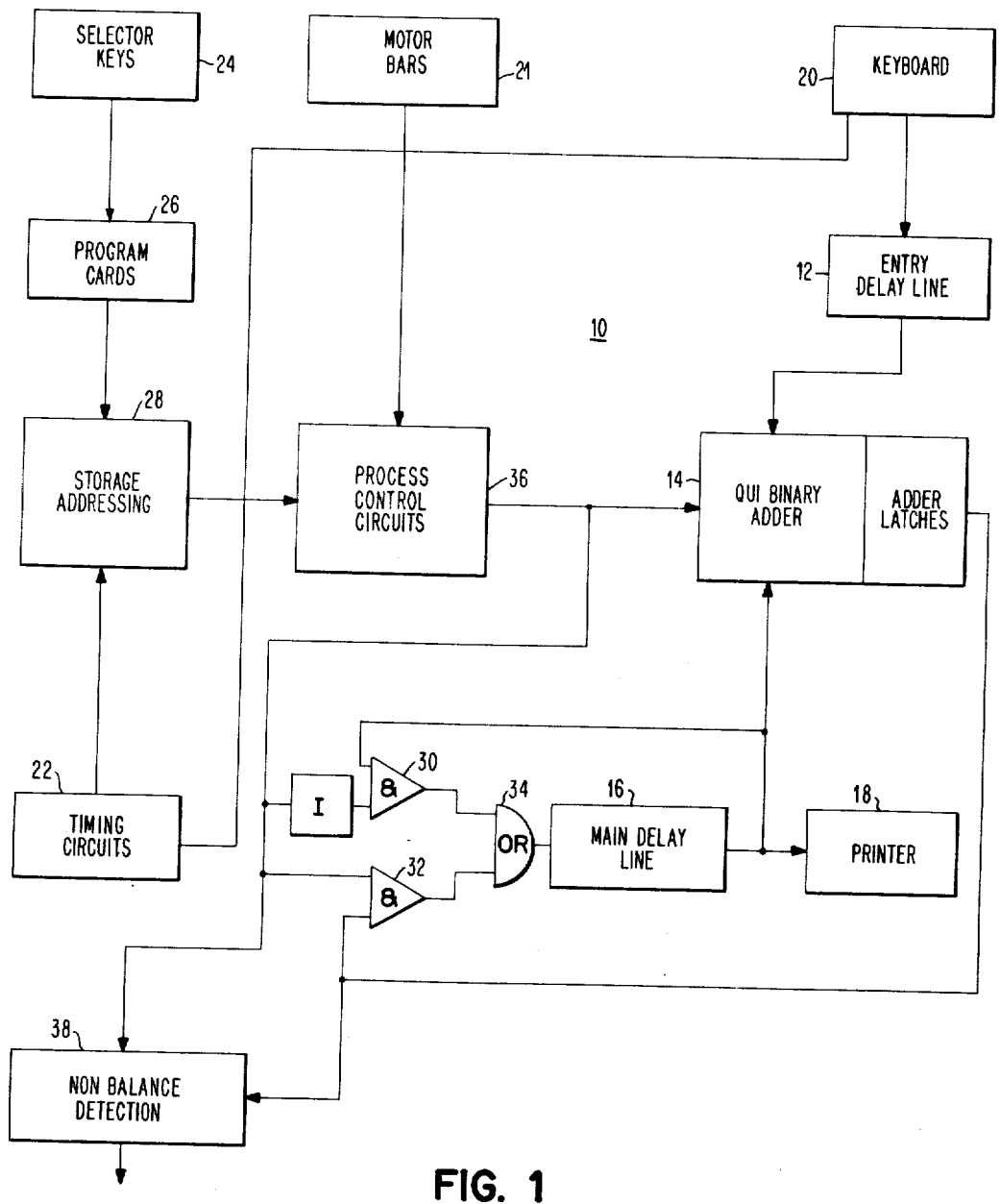
FIGURE 1 is a schematic block diagram illustrating the general relationship of the several portions of the machine circuitry in a preferred embodiment of the invention.
Figure 3A:
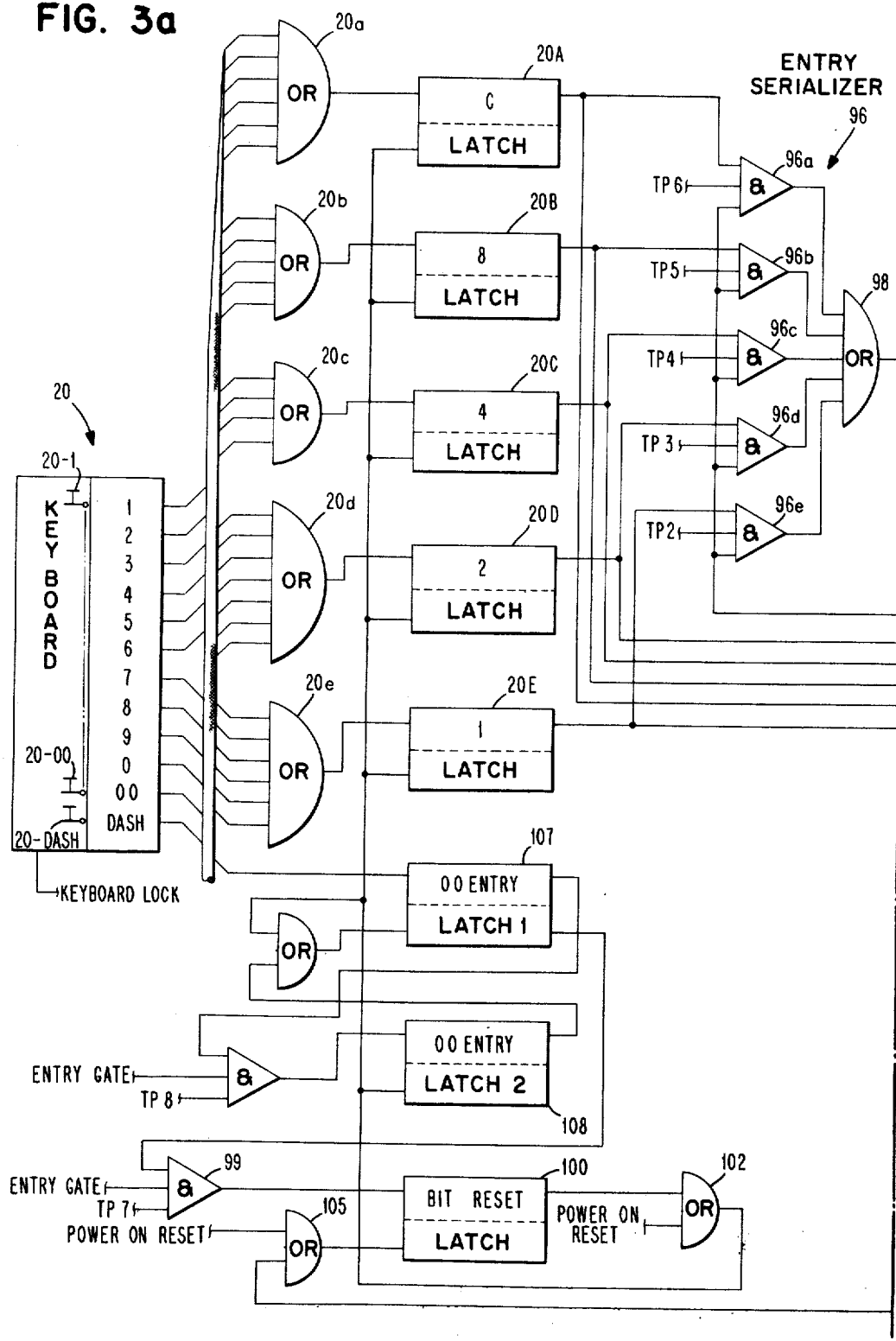
Figure 3B:
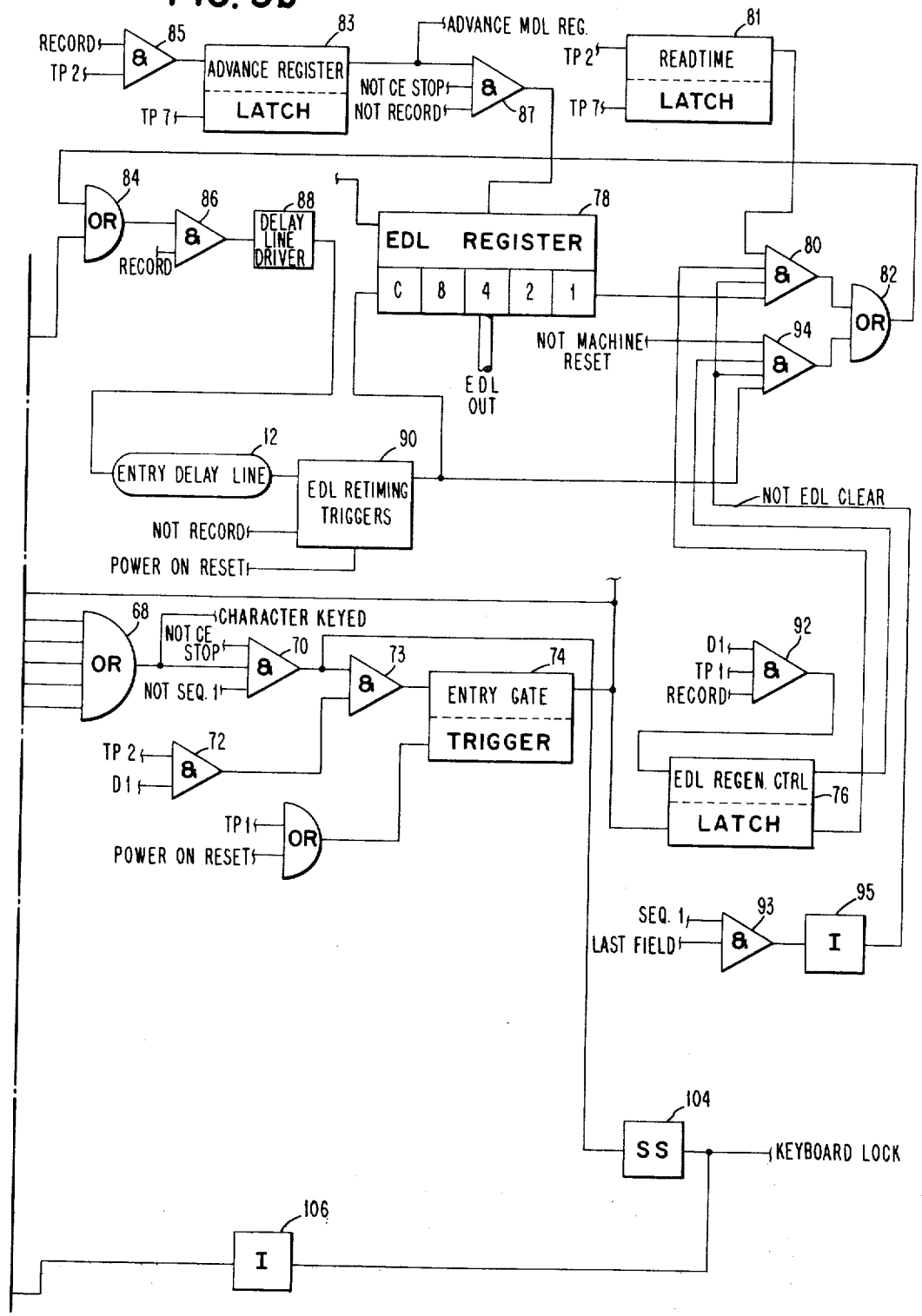
Figure 4D:
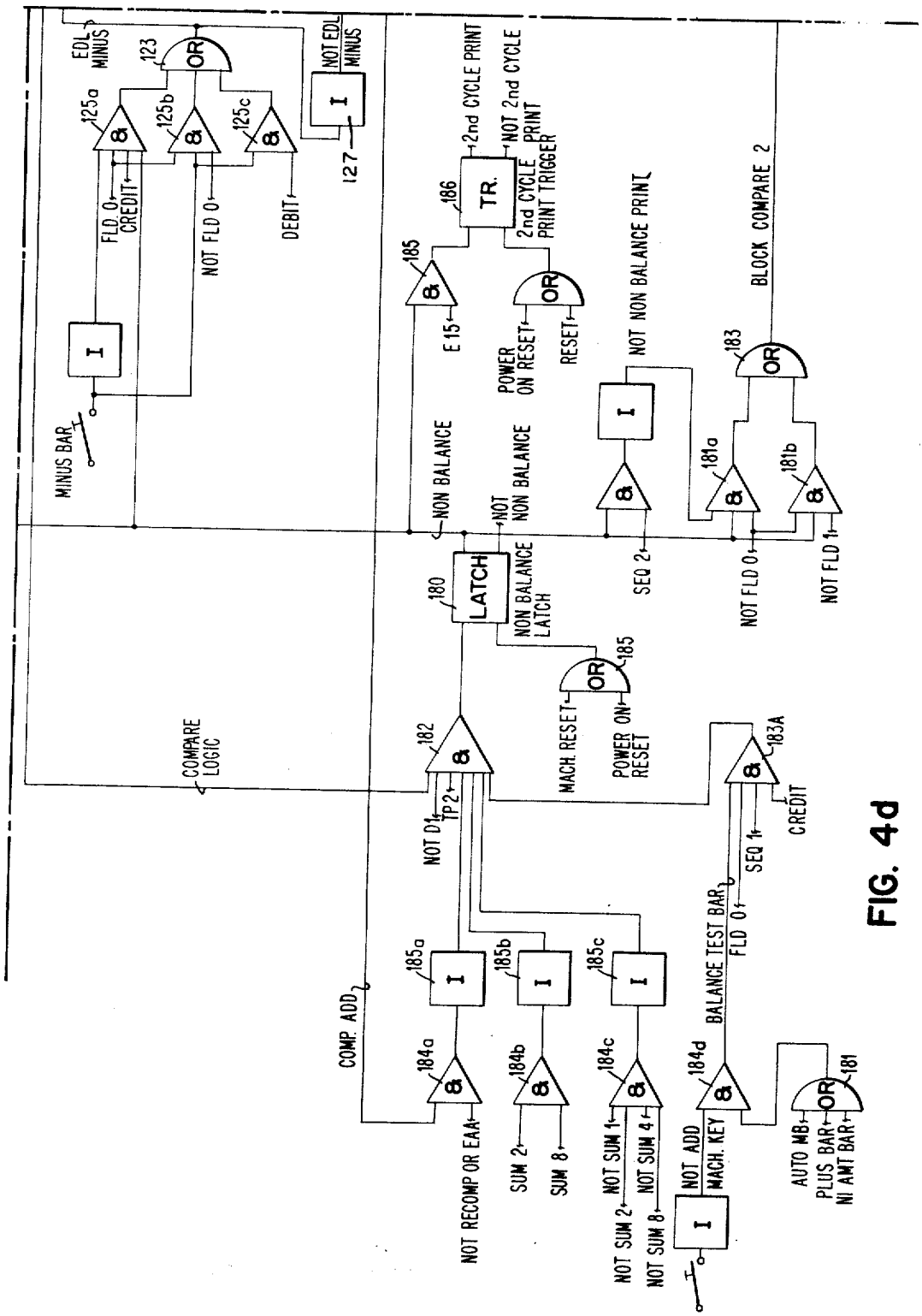
Figure 4E:
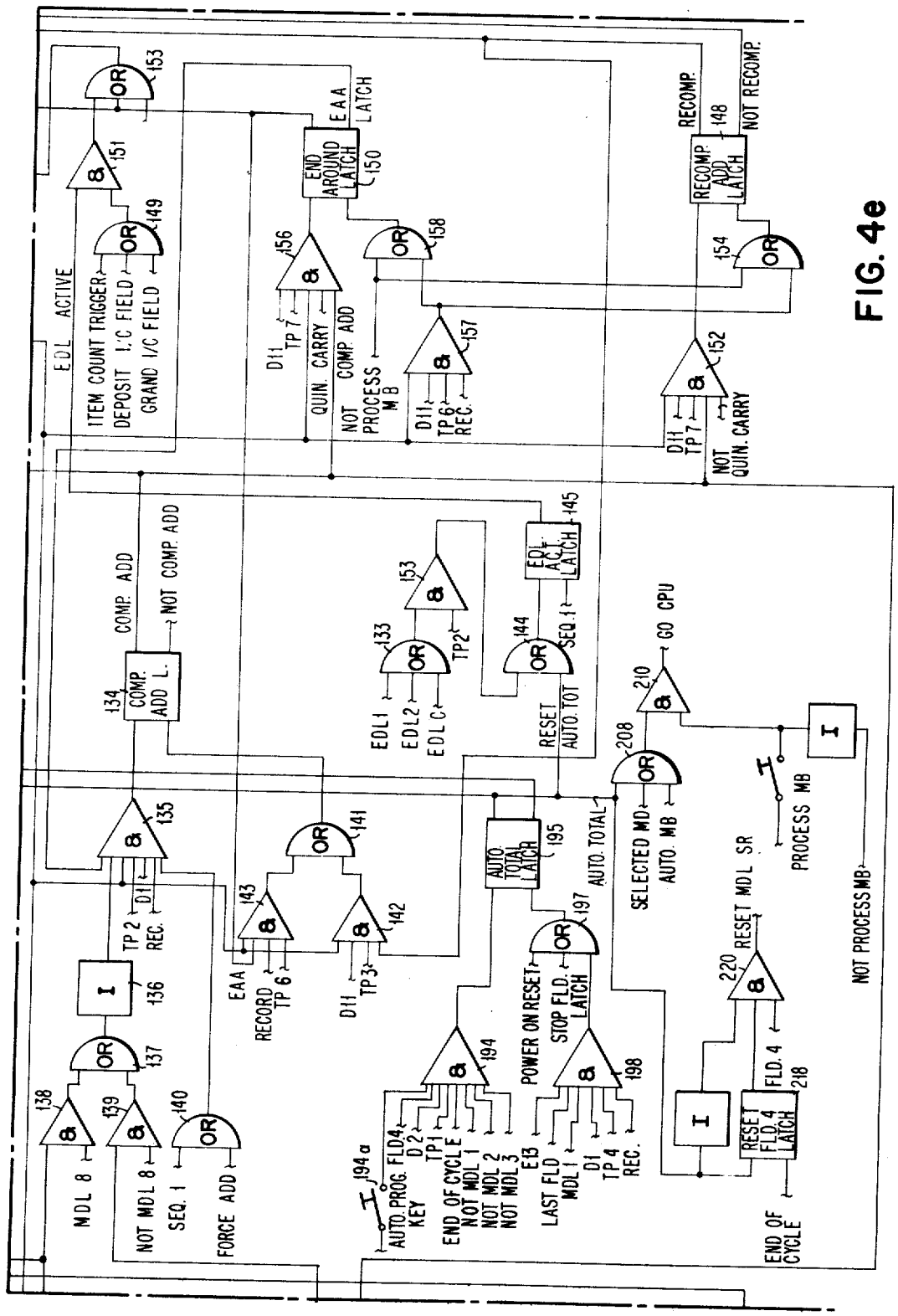
Figure 11:
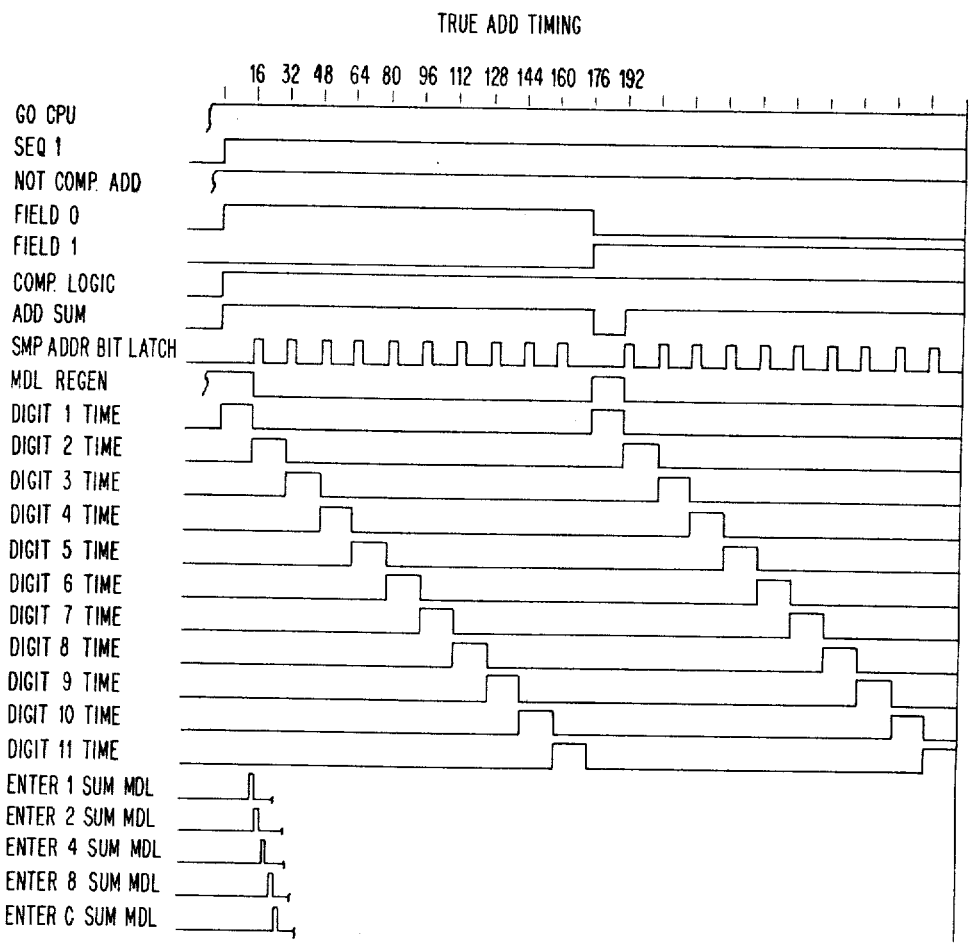
Figure 5:
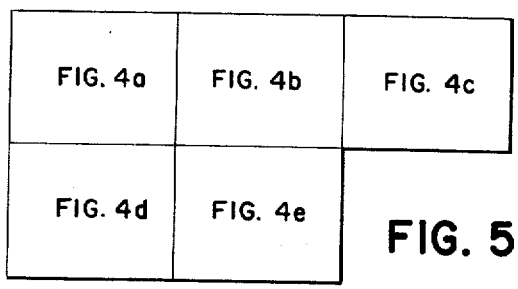
Figure 6:
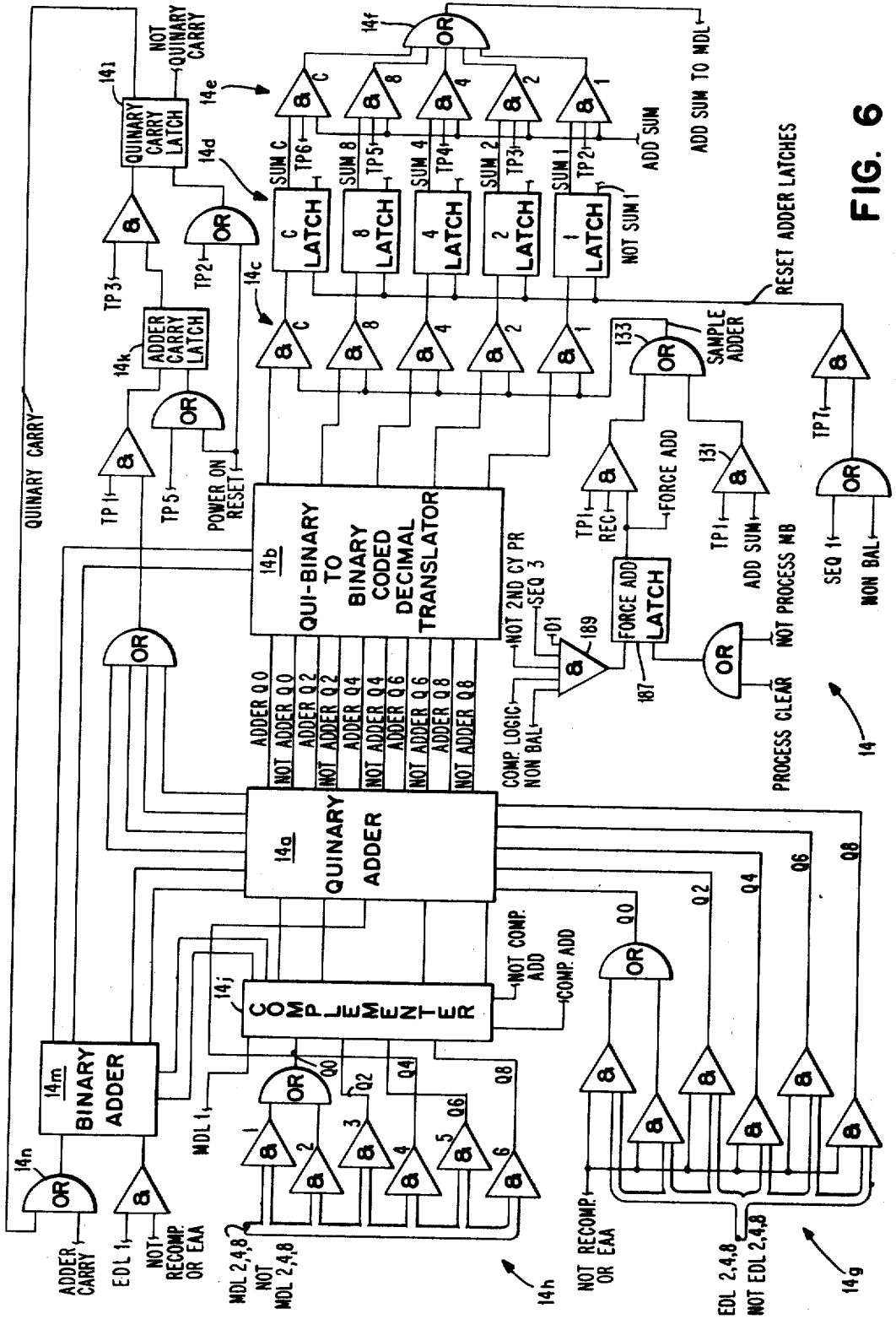
Figure 7:
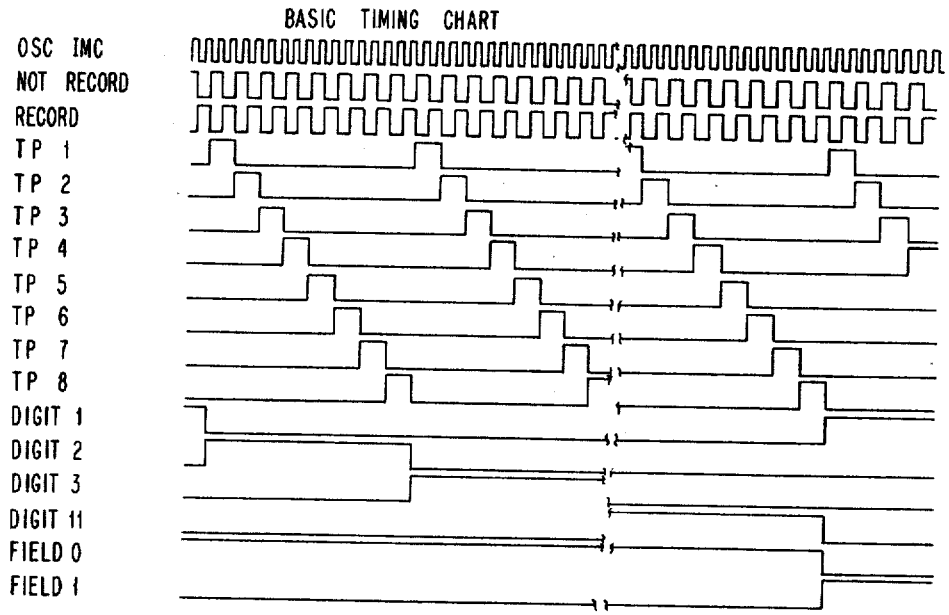
Figure 8:
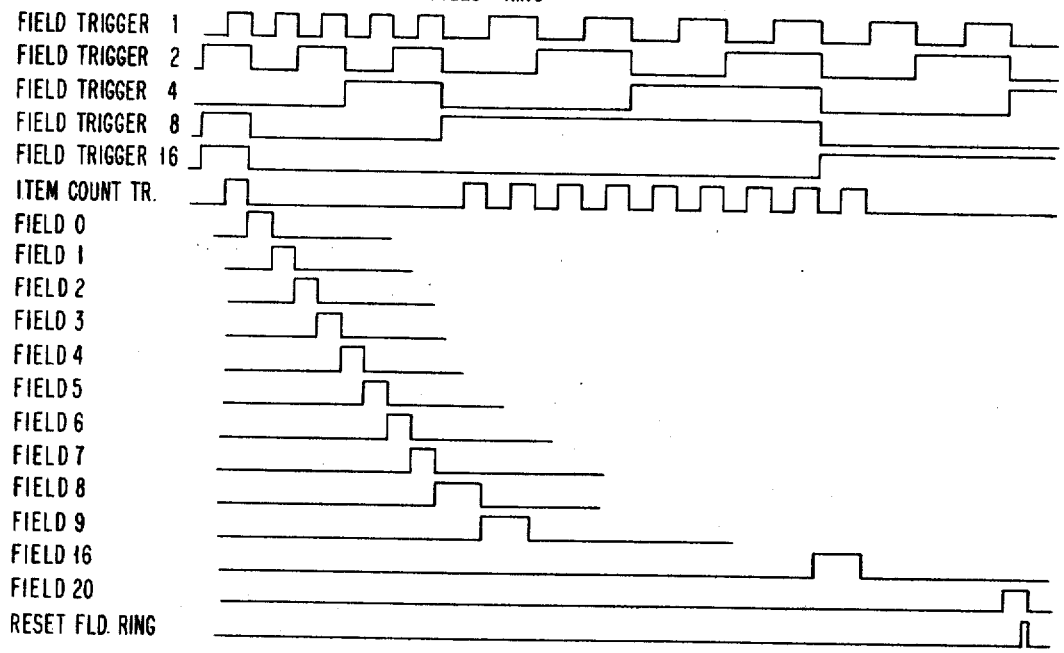
Figure 9:
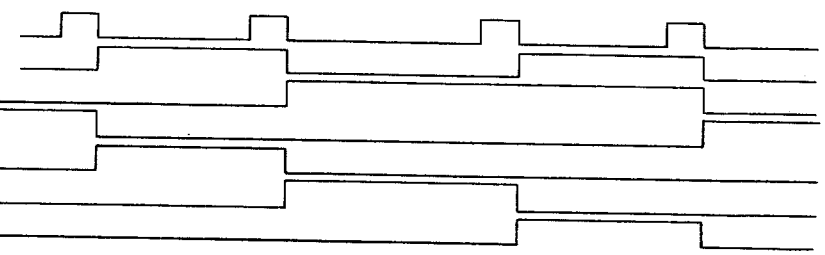
Figure 10:
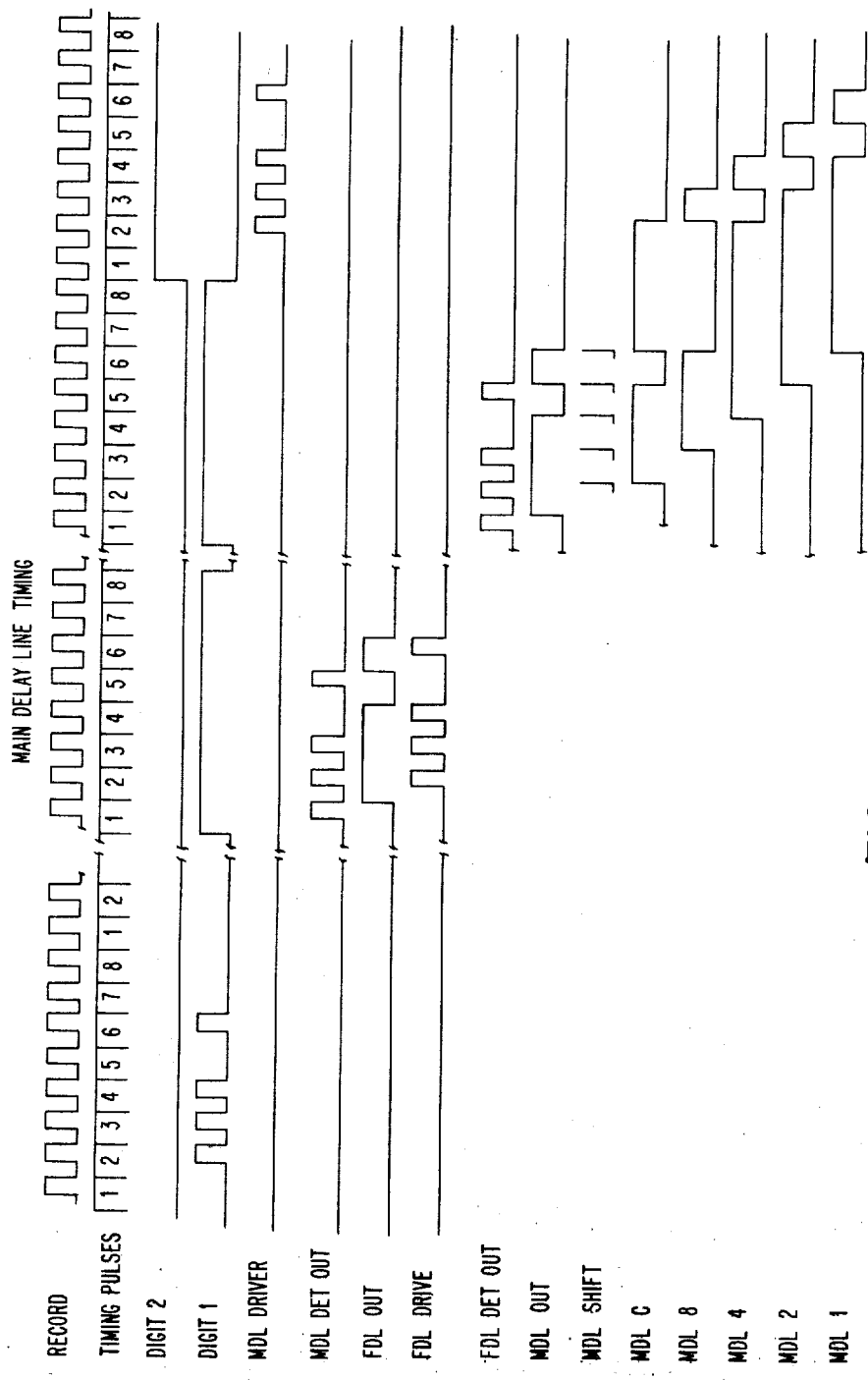
Figure 12:
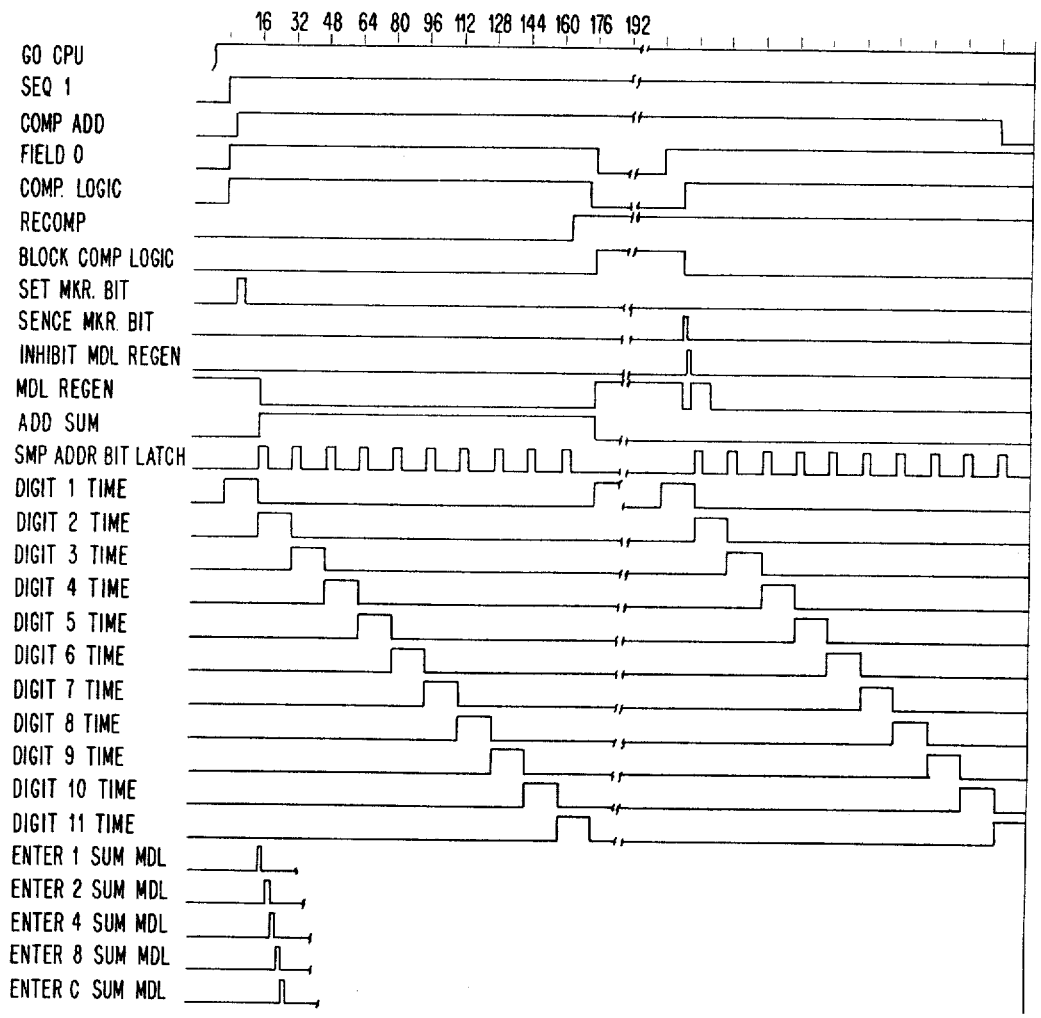

FIGURES 3a and 3b taken together provide a schematic diagram of the digit keyboard and entry delay line circuit shown in FIGURE 1;

FIGURES 4a through 4e taken together provide a schematic diagram showing the connections between the selector keys, program cards, storage addressing, motor bars, process control circuits, the non-balance detection circuits, the main delay line and the adder of FIGURE 1;

FIGURE 5 is a diagram showing the arrangement of FIGURES 4a through 4e;

FIGURE 6 is a schematic diagram giving further details of the adder;

FIGURE 7 is a chart covering the basic timing operations of the bit timing ring;

FIGURE 8 is a timing chart illustrating the operation of the field ring;

FIGURE 9 is a chart illustrating the timing relations of the sequence ring;

FIGURE 10 is a chart illustrating the timing relations for the main delay-line.;

FIGURE 11 is a chart showing the timing relations for a true add operation;

FIGURE 12 is a chart showing the timing relation for a complement adding operation; and FIGURE 13 is a chart showing the timing relations for a complement add-and-end around add operation.

Referring to FIGURE 1 of the drawings, the reference numeral 10 designates generally the controls for an electrical bank proof machine. Entry delay line 12 (EDL) is used as a buffer in conjunction with an adder 14 for updating the contents of a main delay line storage device 16 (MDL) which has an output to a printer 18 for recording amounts in the main delay line. Entry into the entry delay line 12 is made by means of a manual keyboard 20 under the control of timing circuits 22 which provide timing not only for the particular field of the main delay line into which the data is to be entered, but also the digit position and bit position of each digit. Motor bars 21 are provided, which when actuated activate machine circuits to start a machine cycle and initiate transfer of data from the entry delay line to the main delay line.

Control of the field into which the data is to be entered is effected by means of a plurality of selector keys 24 which through a plurality of pluggable program cards 26 provide connections to storage addressing circuits 28 for providing various timing signals for timing the operation of the adder 14 with that of entry delay line 12 and the main delay line 16. The contents of the main delay line are normally regenerated over a circuit through AND 30, and when the contents of a particular field in the main delay line 16 are updated through the adder 14, the updated result is re-entered into the main delay line through AND 32 and OR 34. Operations of the adder 14 and main delay line 16 are effected through a plurality of process control circuits 36. Non-balance detection circuits 38 are provided for locking the keyboard against further operation and preventing any further addressing of the delay line in the event that an error occurs between the sum of a number of checks in a deposit and the total entry from the deposit slip.

Figure 2:
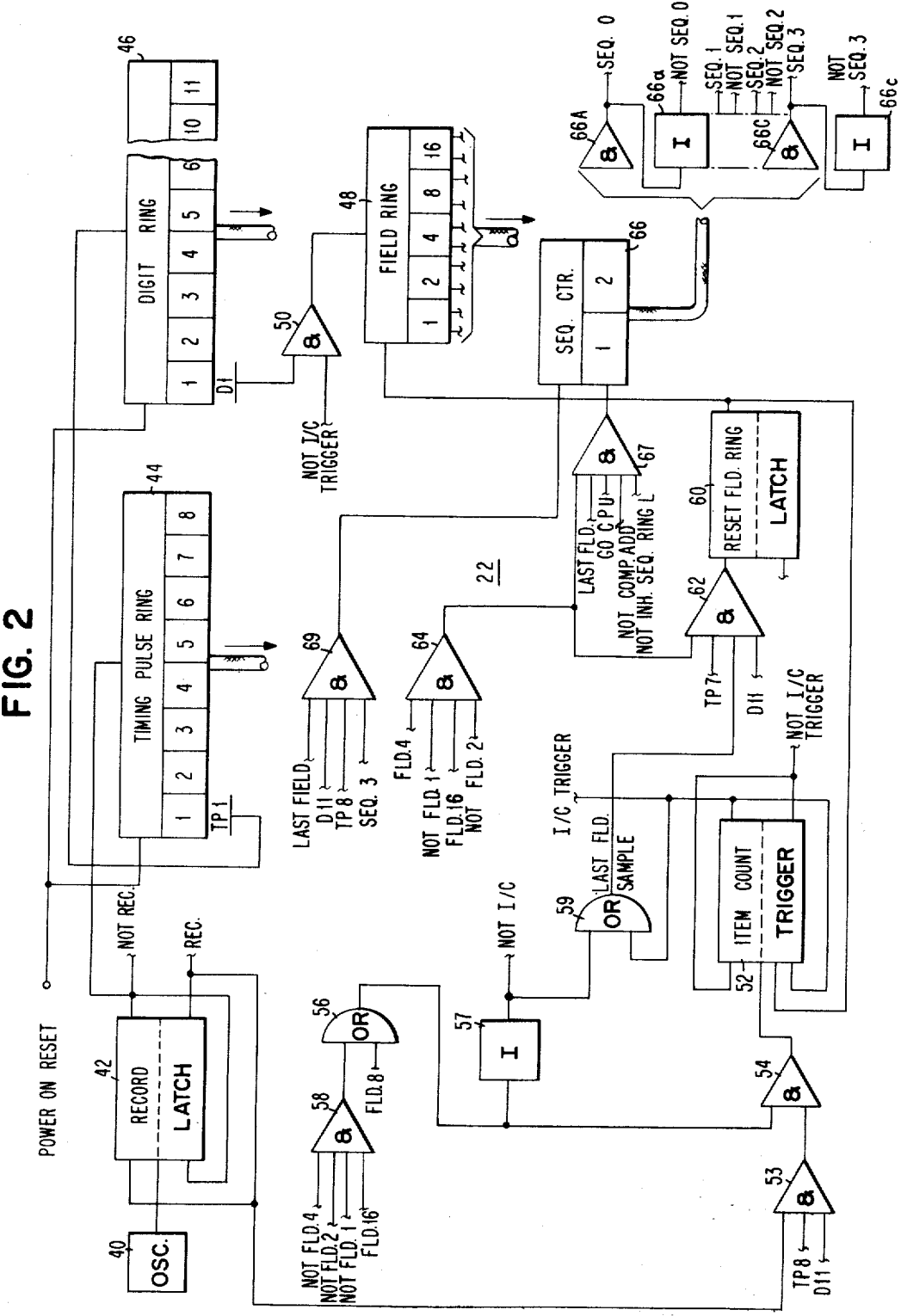
FIGURE 2 is a schematic diagram of the timing circuits shown in block diagram in FIGURE 1.

Referring to FIGURE 2 of the drawings, it will be seen that the timing circuits 22 of FIGURE 1 may comprise an oscillator 40 which drives a Record Latch 42 turning it ON and OFF on successive pulses. The Not Record output of the latch 42 drives an 8-stage timing pulse ring 44 to produce digit bit timing pulses. A digit ring 46 is driven from the first stage of the timing pulse ring 44 and comprises 11-digit positions to accommodate 10 digits in a single field plus a sign position. A field ring 48 is provided, comprising a 5-stage binary counter which is driven from the digit one position D1 of the digit ring 46 through AND 50. The AND 50 is provided for advancing the field ring 48 a count of one for every other field for the distribution total fields which in the present instance comprise fields 8 through 17. This is accomplished by using the Not Item Count output of an Item Count Trigger 52 which is operated through AND's 53 and 54 in response to the output of OR 56. The inputs to the OR 56 are field triggers 8 and the output of AND 58, which has as its inputs Not Field Trigger 4, Not Field Trigger 2, Not Field Trigger 1 and Field Trigger 16. The field ring 48 is reset by the output of a Reset Field Ring latch 60 which is set through inverter 57, or 59 and AND 62 at the end of the Last Field, derived from AND 64.

A sequence counter 66, comprising a 2-stage binary counter is advanced by the output of AND 67 in response to the end of the Last Field, and provides outputs of Sequence 0, Sequence 1, Sequence 2, and Sequence 3 through a plurality of AND's 66A through 66C, together with Not Sequence 0, Not Sequence 1, Not Sequence 2 and Not Sequence 3 through inverters 66a through 66c. Reset is effected by a Process Clear signal derived from AND 69.

Referring to FIGURES 3a and 3b it will be seen that the keyboard 20 may comprise a plurality of keys 20–0 through 20–Dash represented by the key 20–00 which provides a 00 (Double Zero) input for providing circuits to a plurality of OR's 20a through 20e for translating digits 1 through 0 to operate the C, 8, 4, 2 and 1 latches 20A through 20E to store the bits for a digit to be entered into the entry delay line 12. The entry bit latches 20A–20E are connected through OR 68 to provide a Character Keyed Signal which is utilized through AND's 70, 72 and 73 to set an Entry Gate trigger 74, the output of which is used to operate an entry delay line Regeneration Control Latch 76 to provide for regeneration of data in the entry delay line at 12 through the single character register 78, AND 80, OR 82, OR 84 and AND 86 to operate the entry delay line driver 88. Read time is controlled by a Read Time Latch 81 connected to AND 80, and advance of the register 78 is controlled by Advance Register Latch 83 through AND 85 and AND 87. Retiming triggers 90 are provided at the output end of the entry delay line to compensate for variations in the transit time through the delay line and to assist in synchronization. The regeneration control latch 76 is turned ON through AND 92 at TP1 time to provide for regeneration from the entry delay line 12 through AND 94 in conjunction with a Not EDL Clear signal from AND 93 and inverter 95 instead of through the register 78, when there is no bit in any one of the entry bit latches. The entry bit latches 20A through 20E are also connected to OR 84 through a serializer 96 which comprises a plurality of AND's 96a through 96e connected to an OR 98. The contents of the entry bit latches are serialized by gating the AND's with inputs TP2 through TP6 respectively. Reset of the bit latches is effected by means of a Bit Latch Reset latch 100 through OR 102. The latch 100 is turned ON by the Entry Gate signal through AND 99 and is turned OFF at the end of the signal from a single shot 104 through inverter 106 and OR 105, the single shot being turned ON by the output of AND 70 to provide a signal for locking the keyboard until the keyed information is entered. When the latch 100 is set in operation by depressing the Double Zero key 20–00, Double Zero entry latches 107 and 108 delay the operation of the bit latch reset latch 100 until a succeeding cycle of the timing pulse ring 44. The circuitry of FIGURES 2, 3a and 3b is described in more detail in our copending application, Ser. No. 604,276, filed Dec. 23, 1966.

Referring to FIGURE 4a, it will be seen that the selector keys 24 which are characterized by the field 17 key 24–17 are connected to a series of associated latches 110a through 110t, including for example the latch 110q, through a pluggable program card in the block 26 provides a control circuit or circuits for selecting different ones of the 20 fields provided in the main delay line through AND's A0 through A20. Inverters represented by the inverter A0I provide inverted field signals. AND's A8 through A14 are connected through OR 112a and AND's A15–A20 through OR 112b to OR 114 for providing in conjunction with selected inputs from the field triggers 1, 2, 4, 8 and 16 of the field ring 48, timed output signals for each of the fields from 8 through 20. This output is applied to an OR 116 for producing a Field Compare signal which is applied to AND 118 for developing an Address Compare signal. This signal through OR circuit 120 provides a Compare Logic signal which is used to drive the main delay line 16 and activate the adder 14. AND 117 allows a compare for grand item count field 7.

The main delay line 16 accommodates 20 different fields including a single digit shift register 124 at the end of the delay line. Data in the delay line is regenerated over the line 126 through AND 128 and OR 130, except when data in the delay line is being updated by data from the entry delay line through the adder 14. Regeneration is inhibited during an add operation by the absence of Not Add Sum at AND circuit 128 which is derived from Compare Logic through inverter 130I (FIG. 4b) and AND 132.

Referring momentarily to FIGURE 6, it will be seen that the adder 14, which is the well-known qui-binary adder of the 1401 data processing system, comprises a quinary adder 14a with a qui-binary to binary coded decimal translator 14b connected to the C, 8, 4, 2 and 1 sum latches 14d, through a plurality of associated AND's 14c to output AND's 14e which are connected to a common OR 14f to provide an Add Sum to MDL signal.

which is applied to OR 130 (FIG. 4c) to place the output of the Adder in the main delay line. Inputs to the quinary adder 14a are from the entry delay line register 78 through a plurality of AND's 14g, and from the main delay line shift register 124 through a corresponding set of AND's 14h. The connections of the AND's 14h to the adder 14a are through a complementer 14j which is operable to produce the complement or true value of the quantity in the main delay line, depending upon which of the control lines, Complement Add or Not Complement Add, are energized. An Adder Carry Latch 14k and a Quinary Carry Latch 14l provide a carry to a binary adder portion 14m of the adder through OR 14n.

Referring back to FIGURES 4a through 4e, it will be seen that a Complement Add Latch 134 (FIG. 4e) is provided for controlling the operation of the complementer 14j (FIG. 6), depending upon whether the quantities in the entry delay and the main delay line have different signs. The sign of a field in the main delay line is determined by the low order digit position D1. The absence of any bits in D1 indicates the field amount is positive, while the 8-bit indicates a negative amount. The sign of the quantity in the entry delay line is determined by the presence of an Entry Delay Line Minus signal or the absence thereof. This signal is generated at OR 123 (FIG. 4d) through AND's 125a–b–c. The Not EDL Minus signal is generated at inverter 127. The Complement Add Latch 134 (FIG. 4e) is controlled through AND 135, inverter 136, OR 137, and AND's 138 and 139 which determine the presence or absence of the 8-bit in the main delay line and the minus signal for the entry delay line. OR 140 gates the output of inverter 136 in AND 135. When both the entry delay line and main delay line quantities have the same sign the latch 134 is not set and the true add operation takes place. The Add Sum signal from AND 132 sets the particular ones of the latches 14d of the adder and gates the output of these latches in conjunction with the particular timing pulse signals TP2 through TP6. Reset of latch 134 is effected through OR 141 and either of AND's 142, 143.

When a Compare Logic signal occurs for an item count field stored in the main delay line, the Not Re-Complement or End Around Add signal being absent inhibits the adder input gates 14g of the entry delay line. The Re-Complement or End Around Add signal is derived from OR 146 (FIG. 4b) from a Re-Complement Add Latch 148 (FIG. 4e) and an End Around Add latch 150 which determines whether the sign is to be changed. The latch 148 is set by the output of AND 152, and reset through OR 154, while the latch 150 is set through AND 156 and reset through AND 157 and OR 158. An Adder Carry signal is provided at OR 147 (FIG. 4c), through AND 155 and OR 153 from latch 150 (FIG. 4e) AND 151 through OR 149 and an EDL active latch 145, OR 144, AND 153 and OR 133 prevents incrementing the item count unless there are bits in the entry delay line.

A Block Compare 1 latch 160 (FIG. 4b) is provided for blocking Compare Logic during a re-complement add operation, the OFF output being applied to the Compare Logic OR 120 through AND 118 and AND 162 and OR 164. The latch 160 is set by a Complement Add signal through AND 166 and OR 168. Reset is effected through OR 170 and AND's 172, 174 which detect a marker bit in the main delay line. AND 176 (FIG. 4c) is provided for setting a marker bit in the field of the main delay line 16 which is involved in the adding operation, through OR 178 and OR 130.

All check amounts entered are added positive into field 0 of the main delay line, and the selector key depressed for the deposit ticket accompanying the batch of checks is programmed to activate a credit signal, which forces a Minus EDL signal for the first field so that the deposit ticket is subtracted from the field 0. Other than zero balance indicates an error condition. A non-balance latch 180 (FIG. 4d) is utilized to inhibit clearing of the entry delay line upon detection of a non-balance condition. The latch 180 is set through AND 182 in response to coincidence of the outputs of a plurality of AND's 184a–b–c through inverters 185a–b–c which detect other than a zero balance in the field zero when a Bal Test Bar signal is obtained from AND 184d and OR 181 upon depression of a motor bar. A 2nd cycle print trigger 186 set by coincidence of Non-Balance and the E15 emitter signal which which shows approach of end of the first machine cycle provides outputs for controlling the printing of the net difference in field 0 upon an unbalance condition, and printing on a 2nd cycle the total debit (batch) amount in field 1 through AND circuits 188b and 188d (FIG. 4a) respectively. AND 188a provides for adding a debit to field 0; AND 188c provides for adding a debit amount to field 1; and 188 allows adding the debit amount to the grand amount field 2. The outputs of these AND circuits are applied to the Field Compare OR 116 through OR 190. AND 191 and OR 192 provide an output to OR 116 for effecting a field 4 compare to print the deposit item count. AND 193 allows adding to field 4 in a normal compare.

An Automatic Progressive Total Key 194a (FIG. 4e) is provided for obtaining automatic addressing and printing on a master tape of all distribution totals. The key 194a is connected through AND 194 which is reset through OR 197 and AND 198 to set an Auto Total Latch 195. Latch 195 provides an output through AND 199 (FIG. 4a) and Inverter 200 to AND 118 to inhibit address compare on all fields except field 4 during an auto total operation. AND circuit 201 (FIG. 4c) is used to set a marker bit through OR 178 in the main delay line 16 during an automatic progressive total operation in response to the output of AND 202 (FIG. 4b). An Automatic Total Compare latch 203 (FIG. 4b) is set by the output of AND 204 which detects the absence of this marker bit, and is effective to set the Block Compare 1 Latch 160 through AND 205 and OR 168.

TYPICAL OPERATION

A processing operation beings with the operator examining the document to determine the processing to be performed. After examining the document and pressing the appropriate keys, the document is dropped into the feed and a motor bar is pressed.

The processing operation is broken into two types of cycles, electrical and mechanical. The electrical cycle begins when one of the motor bars on the operator's console is pressed. At a stage in the electrical cycle, the mechanical cycle is started by tripping the main cycle clutch, thus, providing mechanical motion to the main camshaft. In general, a bank proof machine processing operation is as follows:

(1) Selector key, together with program card wiring, activates the address decode unit to address the MDL for updating all selected fields.

(2) Data keyed into digit keys sets entry bit latches in the BCD code.

(3) BCD data is placed on EDL serially in position D1 by the timing pulse ring (TP–2 to TP–6 times).

(4) As each digit is keyed, the data enters the EDL shift register and is regenerated back onto the EDL. The next digit keyed moves the existing digit on the EDL into position D2 by way of the EDL shift register, while the new digit enters position D1. This shifting of digits continues until all digits are keyed.

(5) Motor bar activates the selected MB trigger to advance the sequence counter to sequence 1 (add time).

(6) The compare logic line is activated for each field of the MDL to be updated.

(7) Data read from EDL and MDL shift registers is fed into their respective qui-bi translators.

(8) The signs associated with the EDL and MDL data are then checked to determine if a true add or complement add operation is to be performed.

(9) The qui and bi portions of the data are added and translated into BCD.

(10) The BCD data is then read back onto the MDL, serial by bit by digit, during TP–2 to TP–6 times.

(11) The adding continues until *all* selected fields have been updated.

(12) After the last field of the MDL has been updated the sequence counter advances to sequence 2 (print time).

(13) At this time, the main cycle clutch is energized and the main camshaft begins to rotate, turning the print emitter and set up sectors.

(14) Field 6 of the MDL, which is reserved for printing, is read out and, together with the print emitter, picks the print latches and print magnets. The print magnets stop the rotation of the set up sectors when the selected digit has been set up.

(15) Because the set up sectors control the linkage to the control printer, inscriber, and distribution printer, these three print units are ready for printing when the set up sectors have stopped.

(16) The control-printer print sectors are fired mechanically and the amount is printed on the control tape.

(17) The presence of a document at the inscribe station energized the inscribe magnet and the document is inscribed.

(18) The program wiring, together with the selector key at the appropriate emitter time, energizes a pocket print magnet to print the amount on the distribution tape and also energize a pocket select magnet to select the document into the appropriate stacker.

In the main delay line, provision is made for a total of 20 fields which are defined as following:

0—Group A—deposit net difference
1—Group total B—total of the deposit checks
2—Grand total—total of all checks entered
3—Serial number
4—Deposit item count
5—Add machine mode total
6—Amount keyed
7—Grand item count
8—Fields 8 through 20—description totals with item counts.

The fields are listed in the actual sequence they are assigned in the main delay line storage. Thus, group total A occupies the lowest order storage position and has an address corresponding to 00 number count of the binary coded field ring. The distribution total fields are used under program control to accumulate various classes of totals. For example, a distribution total may be assigned to accumulate a dollar total of the checks being sorted into a particular stacker. An item count field is associated with each distribution total field by the total field and associated item count field bar. The same address is used so that the field ring counts only one field for both. When the field ring reaches a count equal to 20 fields, the reset field ring latch 60 of FIGURE 2 is reset to the 00 state. One cycle of the field ring 48 then corresponds to one revolution of the data in the main delay line storage device 16. The main delay line storage device may be a magnetostrictive or sonic which stores data serial by bit, by digit and by field. The delay line 16 is long enough to satisfy the storage capacity required by the total field less one digit. The last digit of the storage device is the single character shift register 124 attached to the end of the delay line. This register allows digits to be available in parallel by bit form to serve as inputs to the qui-binary adder 14.

The main delay line 16 with its shift register 124 has a field format of 11 digits per field (10 digits of amount plus one sign position which is associated with the field D1 position).

The general arrangement comprises the two delay lines, the entry delay line 12 and the main delay line 16 with one digit shift registers 78 and 124, respectively, attached to the ends of the lines. The amount keyed by the operator is stored in the entry delay line and supplies one input to the qui-binary adder 14. The total stored in the main delay line 16 which is to be updated, supplies the other input. Addition is performed serial by digit and as a new sum digit is generated in the adder, it becomes available to the serializer 14e which enters the new digit into the main delay line. As a new digit is being entered, the digit previously in this position in the main delay line, and which was one input to the adder, is inhibited from being regenerated by the absence of non-add sum signal at the input to AND 128 and hence is allowed to shift out of the main delay line register 124.

The entry delay line 12 is one field long. Therefore, as each field in the main delay line passes through the main delay line shift register 124, the entry delay line makes one revolution. Thus, all fields in the main delay line should be updated with an amount in the entry delay line which can theoretically be addressed and updated in one revolution of the main delay line.

Initially, the operator depresses a particular selector key on the machine keyboard 24, for example the key 24–17. The keys can be programmed by jumper wires on the pluggable program boards 26 to cause the machine to perform many different functions on a particular cycle by providing connections between different ones of the selector key latches 110a through 110m to different ones of the field AND circuits A8 through A20. Primarily, they provide for the addressing for the different totals which it is desired to update and the selection of one of 8 stackers to which a check being processed is to be delivered. The selector keys 24 can be programmed to activate any of the select fields 8 through 20. Each of these lines drives an input to one of the AND circuits A8 through A20, the remaining inputs to these AND circuits being driven by the field ring triggers which serve to decode the field ring outputs into an address for each of the fields 8 through 20 in the main delay line. For example, if key 24–17 is depressed to set latch 110m, one input to the AND A–17 will be provided over conductor 205. The other input will be provided by the 1 and 16 triggers of the field ring 48 to activate the AND circuit and generate a field 17 address signal through OR 112b, OR 114, OR 116, AND 118, OR 120, AND 129 and OR circuit 130 to indicate that field 17 is at the end of the main delay line and is being addressed through the register 124 perhaps for updating by information in the Entry Delay Line 12 if the sequence counter is in sequence 1. It could also be addressed for printing.

Next the operator keys the amount into the entry delay line through the keyboard 20 where it is translated through the OR's 20a through 20e into BCD and is stored in different ones of the latches 20A through 20E for entry into the delay line 12 through the serializer 96. After the operator depresses a selected motor bar such as the Plus Bar to develop a Go CPU signal, which starts the sequence counter 66, the sequence counter is advanced from the OFF to the sequence 1 position by a coincidence of Go CPU and the trailing of the last field signal through AND 68. This activates the circuitry to allow the addition of the entry delay line amount to fields in the main delay line addressed by the selected selector key.

As the first Compare Logic signal is developed at OR 120 during sequence 1, the low order digit (D1) of the field is in the main delay line shift register 124. Digit D1 stores the sign (plus or minus) of the field, the absence of and bits indicating a positive amount and an 8-bit indicating a negative amount. The main delay line 8 from the shift register 124 and the entry delay line minus signs are sampled at time TP2 and Digit D1 in AND circuit 135 (FIGURE 4b). If either line, but not both, is active, the Complement Add latch 134 (FIGURE 4b) is set. If both lines are at the same level—either active or inactive—the Complement Add latch 134 is inhibited from being set and a true add operation occurs for the field being updated. The entry delay line minus signals are generated primarily by the credit key 191a (FIGURE 4a) or Minus Bar at the keyboard. The sign position is always regenerated in the main delay line unless a change of sign is indicated at the end of a complement add/subtract function. At the end of D1, the coincidence of Sequence 1 and Compare Logic generate the Add Sum signal at AND 132 (FIGURE 6). The low order amount digit D2 is now in the main delay line shift register 124. The low order digit of the entry delay line amount is likewise in the entry delay line shift register 78. The output lines from these two registers supply the digit inputs to the adder 14. If a true add operation is required, the main delay line digit is not complemented but is gated directly into the adder in response to the presence of the Not-Complement Add signal in the complementer 14j (FIGURE 6). At TP1 and Add Sum while the digit bits are stacked in the shift register, a Sample Adder signal is generated from AND 131 through OR 133 (FIGURE 6) which gates the AND circuit 14c of the adder, allowing the sum of the two input digits to be set in the BCD adder bit latches 14d. Timing pulses TP2 through TP6 gate the outputs of whichever of the latches are set, through AND circuits 14e to generate an ADD Sum to MDL signal at OR 14f. This signal drives the main delay line driver 16 through OR 130 and AND 122 (FIGURE 4c) to store the bits for the new sum digit in the main delay line. At the same time, the Add Sum signal inhibits the AND 128 (FIGURE 4b) which normally provides for regeneration of the main delay line bits. As a result, the previous digit in the main delay line which supplied one input to the adder 14 is replaced with a new sum digit. This process repeats for succeeding digits of the selected field until a blank is sensed in corresponding digit positions of the entry delay line and main delay line or the end of the field is reached and the Compare Logic signal goes off. Either condition will inhibit the Add Sum signal and turn OFF the add operation. This process also repeates for each field of the main delay line which is addressed by a Compare Logic signal during sequence 1 as determined by the pluggable program control boards 26, which provide connections between the different selector keys 24 and the field selection AND circuits A8 through A20.

When the Compare Logic addressing signal occurs for an item count field stored in a main delay line, the Re-comp or EAA signal and the Adder Carry signal are generated at OR 146 (FIGURE 4b) and OR 147 (FIGURE 4c) respectively. The Re-comp or EAA signal inhibits the adder input gates from the entry delay line by removing Not Re-comp or EAA from the AND circuits 14g of FIGURE 6. The Adder Carry signal forces a carry into the adder 14 for the low order D2 digit position of the item count field through OR 149, AND 151, OR 153 (FIGURE 4e), AND 155 and OR 147 (FIGURE 4c). As a result, the item count stored in the main delay line is incremented by one.

In a true add operation, all fields can be updated in one revolution of the main delay line. At the end of a last field time, the sequence counter 66 is advanced from sequence 1 to sequence 2 which is defined as a print sequence.

If in an add operation the EDL minus signal or the MDL 8 line for the D1 position of the field being updated, but not both, are activated, the Comp Add latch 134 (FIGURE 4e) is set through AND 135. This signal gates the main delay line input to the adder through circuitry in the complementer 14j which produces the nine's complement of the digit. This digit is added to the entry delay line digit, all digits of the field being treated similarly in turn. The nine's complement of the total is then stored in the main delay line. Another operation must be performed on this field to obtain the true difference. Thus, at the end of the field when there is a coincidence of complement add D11, and TP8 the block compare 1 latch 160 is set through AND 166 and OR 168 (FIGURE 4b). The OFF output of latch 160 is removed from the AND 118 and inhibits the Address Compare signal used to develop the Compare Logic signal at OR 120. Thus no more addressing is allowed until the main delay line makes a complete revolution and returns to the same field for the extra operation.

The operation required will be either a recomplement of the field, or an end around add. The mathematics of the addition are such that if a high order carry results at the end of the field, an end around add operation is required to adjust the total. This involves adding one to the low order digit D2 of the field. If there is no high order carry at the end of the comp add operation, then a re-complement operation is required to adjust the field. Thus at the end of the complement add operation, the carry indication from the adder is sampled. A coincidence of Compare Logic, Comp Add, D11, TP7 and quinary carry signals, sets the End Around Add Latch 150 through AND 156 (FIGURE 4e). A coincidence of these signals and Not Quinary Carry sets the Re-Comp Add latch 148 through AND 152.

At the start of a complement add to a field, a coincidence of Comp Add, Compare Logic, TP4 and D1 activates AND 176 (FIGURE 4c) which provides an output from OR 178 to produce a set marker bit signal over the line 179 which stores a 4-bit as a marker bit in the D1 position of the field. At the end of the complement add to a field, the Block Compare 1 latch 160 (FIGURE 4b) is set as previously explained. The main delay line now makes a complete revolution through the last field and back to the field being processed. The fact that the Comp Add latch 134 (FIGURE 4e) is ON, inhibits the end of the Last Field signal from advancing the sequence counter through AND 67 (FIGURE 2) from sequence 1 to sequence 2. When the same field again reaches the end of the main delay line, the marker bit that was stored in the D1 position is detected through AND 174 (FIGURE 4b) and the Block Compare 1 latch 160 is reset. This allows the Compare Logic signal to come ON at OR 120, activating the Add Sum signal at the output of AND 132. After Re-comp signal is ON at the output of latch 148 (FIGURE 4e), the field in the main delay line is set through the complementer 14j added to zero because the Re-comp or EAA signal inhibits the entry delay line input to the adder, and stored in the main delay line. The true result is now stored in the main delay line. If the EAA signal is ON, Adder Carry is forced for the low order amount digit through OR 153, AND 155 and OR 147. At the end of the field (D11 and TP6) the Re-comp latch 148 or the End Around Add latch 150 is reset from AND 157. This completes the mathematical operation on the field.

As the End Around Add latch 150 is set, the mathematics of the complete addition are set so that the sign in the main delay line which the field being operated on must be changed. If EDL minus signal is ON, a minus sign (8 bit) is stored in the main delay line at TP5 of D1 time during the end around add through AND 129 (FIGURE 4b). If the main delay line is minus, a plus sign is stored by inhibiting regeneration of the 8 bit during D1 of the end around add through OR 187 and inverter 189.

All check amounts entered add positive into field 0, the first field addressed in the MDL. The selector key depressed for the deposit tickets that are represented by the credit key 191a is programmed to activate a credit signal to the logic circuitry. This signal forces an EDL minus signal for the first field only through AND 125a and OR 123 (FIGURE 4d). As a result, the deposit ticket amount is subtracted from field zero. If the deposit is in balance, the total of the checks should equal the deposit ticket amount and the total for field 0 should be zero after the subtract cycle. The adder inputs are sampled for a 0 (8 sum and 2 sum) or a blank during the recomplement or end around add cycle of a field 0 when a credit is indicated, at AND 184a through 184c (FIGURE 4d). If any digit in field 0 is not zero or blank, the non-balance latch 180 is set through AND 182. The non-balance signal forces a block compare signal through ANDs 181a, 181b and OR 183 which inhibits any more processing, inhibits the documents from being fed, locks out the keyboards and prevents inscribing of the document. It also forces the amount remaining in the field 0 to print on the master tape by providing an output for AND 188b and causes field 1 which contains a total of the checks to print on a master tape in a second machine cycle by producing an output at AND 188d (FIGURE 4a).

This provides the operator with the net amount the deposit is out of balance, and the total of the checks entered for the deposit, which information facilitates locating the error in the deposit. Depression of a Machine Reset key resets the Non-balance latch 180 through OR 185. The machine is then free for a correction to be made and a new balance cycle to be attempted. Following the print cycle for field zero (net difference amount) the Non-balance signal and Compare Logic for field 0 set the Force Add latch 187 shown in FIGURE 6, through AND 189. The Force Add signal forces an Add Sum signal through OR 129 and AND 132 (FIGURE 4b), so that the deposit ticket amount is added back into the field 0. This is necessary to bring the field 0 back to the same total contained before the balance cycle was started. The operator then makes any entry necessary to correct the field 0 amount and rekeys the deposit ticket amount for another balance attempt. If the deposit is in balance, a normal processing cycle occurs and the Group A and B total fields are cleared in preparation for the next deposit by inhibiting regeneration at AND 128 (FIGURE 4b) by a Balance Clear signal developed through coincidence of sequence 3 and field 0 or field 1 or field 4, through OR 220, AND 221 and inverter 222.

By depressing the Auto progressive or Auto total key 194a on the machine keyboard all distribution field totals will be automatically addressed and printed on a master tape. The auto total key sets the auto total latch 195 (FIGURE 4e) through AND 194, at TP1 of D2 of field 4 if field 4 in the main delay line is empty. Thus, the auto progressive key will have no effect unless field 4 is empty. Since field 4 is the deposit item count field and is cleared at the end of each deposit in preparation for a new batch of checks, automatic progressive totals can only be taken between deposits. This requirement is necessary because field 4 is used to generate the numbers 1 through 13 that print out with the corresponding distribution total fields.

When the auto progressive key sets the auto total latch 195, the auto total bar signal is generated which provides the Go CPU signal to the sequence counter 66 of FIGURE 2 through OR 208 and AND 210. This advances the counter to sequence 1. Since the function desired is printing, all processing during sequence 1 is inhibited by Auto Prog Inhibit except for field 4 through AND 199 (FIGURE 4a). Since field 4 is an item count field initially empty, it increments in the previously described manner to a count 1.

The field ring 48 advances to a count of 8. This is the address position for the first distribution total field. At TP3, D1, Not MDL 2 and FLD 8 and auto total bar, the Auto Total Compare latch 203 (FIGURE 4b) is set through AND 204. This latch performs the function of forcing Auto Total Compare, which in turn generates Compare Logic for the field to be printed through AND 202 and OR 120. At the end of the field—D11, TP8—Auto Total Compare latch 203 satisfies AND 205 to set Block Compare 1 latch 160 through OR 168. This latch inhibits Auto Total Compare by removing the OFF output from AND 212 and prevents Compare Logic from occurring again until the main delay line revolves around to the first distribution field. At field 0 time the Auto Total Compare latch 203 and the Block Compare 1 latch 160 are reset by the field 0 signal. When the field ring again advances to the 8, the same process is repeated. As a result Compare Logic is continuously being generated throughout the print cycle for only the first distribution total field. The amount accumulated in this field then prints during sequence 2 on the master tape.

When the print cycle sequence (sequence 2) is completed, the sequence counter 66 is advanced to sequence 3. At auto total compare time during this sequence, a 2 bit is stored as a marker bit in the digit position D1 of the field that was printed during sequence 2. This is accomplished by the output of AND 201 (FIGURE 4c) being fed through OR 178 to OR 130 for operating the delay line driver 16a to set a marker bit at TP4 of D1 in sequence 3.

The Auto Total latch 195 remains ON and continues to supply a Go CPU signal to the sequence counter. As a result the machine clutch remains picked and the machine starts a new cycle as soon as the previous one is finished. During sequence 1 of the second cycle field 4 is incremented to a count of 2. This number prints during sequence 2 with the second distribution total field, the Compare Logic signal being obtained through AND 188b, OR 190, OR 116, AND 118 and OR 120. The Auto Total Compare latch 203 (FIGURE 4b) will be set and force Compare Logic signal for the second distribution total instead of the first, because the AND block setting this latch is satisfied by D1 of the first distribution field that does not contain a main delay line 2 bit as a marker bit. The absence of this marker bit is detected and latch 203 is set by the AND 204, which has among its inputs Not MDL2, D1, Item Count Trigger and field Triggers 8 or 16. The second distribution field is printed and a marker bit is stored in its low order digit position during sequence 3 through the operation of AND 198, OR 178, and OR 130. Thus each cycle a distribution total is printed and marked, and on the next machine cycle the first distribution total field without a marker is addressed for printing. This process continues until the last field has been printed. When a marker bit is detected in D1 of last field at E13 time, the auto total latch 195 is reset by the activation of AND 198. The Go CPU signal is removed from AND 210 (FIGURE 4e) and the machine stops cycling. A reset MDL signal is generated for field 4 by a reset field 4 latch 218 and AND 220. This dumps the deposit item count field after an auto total operation. The latch 218 is reset by an End of Cycle signal which comes from a machine emitter that tells the machine is at the end of its mechanical cycle.

The system of the invention provides for adding a keyed amount stored in an entry delay line through a quibinary adder to a variable number of field totals stored in a main delay line. A means of program control is provided which is flexible and allows addressing of any combination of totals on a bit machine cycle. The system provides for performing an automatic test in the end of a batch of checks representing a deposit to determine the balance status of the deposit.

A deposit total is listed on a machine marker bit if a 0 balance is detected. If other than a 0 balance is detected, the machine print cycles are forced to list successively the net difference for amount deposit out of balance and the total of the checks entered for the deposit so as to enable the operator to determine where the error occurred. Provision is made for automatically generating addressing of the main delay line storage to access and list without clearing of totals in the main delay line storage for audit trail purposes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a bank proof machine, a main delay line storage device having a single digit register connected thereto at one end to provide an output, and having a capacity including said register to store a plurality of fields of data each comprising a predetermined number of digits and having driver means connected thereto at the other end for entering coded digit representations of data into said main delay line fields, and regeneration circuit means connecting said output and said drive means to complete a recirculating path for said coded digit representations of data in said main delay line, an entry delay line storage device having an input and an output and having a capacity to store only a single field of coded digit representations of data to be entered into one of said plurality of fields of coded digit representation of said main delay line and also having driver means connected to said input of said entry delay line for entering coded digit representations of data into said entry delay line, said entry delay line having a single digit register connected to its said output, with said single digit register being in addition to said one field capacity, and regeneration circuit means connecting said output of said entry delay line storage device and said single digit register to said driver means of said entry delay line to provide a recirculating path for said coded digit representations of data in said entry delay line, an adder having addend and augend inputs connected to said entry delay line single digit register and said main delay line storage device output respectively and a sum output circuit, keyboard means connected for operating said entry delay line driver means to enter coded digit representations of data into said entry delay line storage device, control means including a field count ring, field address selection means selectively operable for providing said address of a selected one of said plurality of fields of data in said main delay line storage device, and compare means connected thereto to provide an address compare signal when the count of said field count ring and said address in said address selection means compare, for addressing at a predetermined time said selected one of said fields of data in said main delay line storage device and said sum output circuit of said adder, and circuit means connecting said adder sum output circuit to said main delay line storage device driver means for entering updated data into said selected main delay line field of data, said updated data for being the sum of said entry delay line data representation and said selected main delay line field data representations.

References Cited

UNITED STATES PATENTS

| | | | |
|---|---|---|---|
| 3,181,123 | 4/1965 | Wright et al. | 340—172.5 |
| 3,196,402 | 7/1965 | Gehring et al. | 340—172.5 |
| 3,239,816 | 3/1966 | Breslin et al. | 340—172.5 |
| 3,248,528 | 4/1966 | Campeau | 340—172.5 |
| 3,351,917 | 11/1967 | Shimabukaro | 340—172.5 |

PAUL J. HENON, Primary Examiner

H. E. SPRINGBORN, Assistant Examiner

PO-1050
(5/69)

UNITED STATES PATENT OFFICE
CERTIFICATE OF CORRECTION

Patent No. 3,492,655          Dated January 27, 1970

Inventor(s) Stephen Deskevich and John B. Newman

It is certified that error appears in the above-identified patent and that said Letters Patent are hereby corrected as shown below:

In the specification, Column 6, line 41, "beings" should read --begins--. Column 7, line 34, between "Group" and "A" insert --total--. In the claims, Claim 1, Column 13, line 13, "drive" should read --driver--; Column 14, line 19, cancel "for".

SIGNED AND
SEALED
AUG 25 1970

(SEAL)
Attest:

Edward M. Fletcher, Jr.
Attesting Officer

WILLIAM E. SCHUYLER, JR.
Commissioner of Patents